(No Model.) 3 Sheets—Sheet 1.
J. L. STEWART.
PROCESS OF AND APPARATUS FOR MANUFACTURING GAS.
No. 291,421. Patented Jan. 1, 1884.
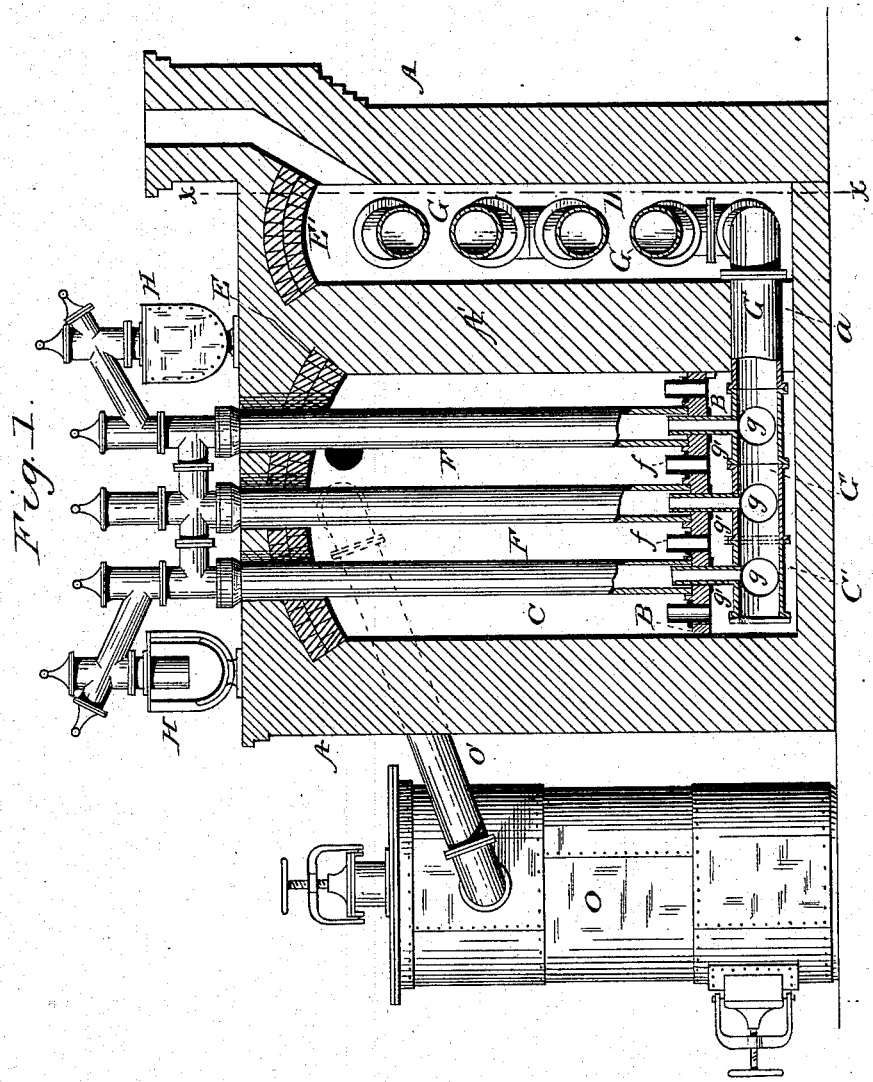

(No Model.)
J. L. STEWART.
PROCESS OF AND APPARATUS FOR MANUFACTURING GAS.
No. 291,421. Patented Jan. 1, 1884.
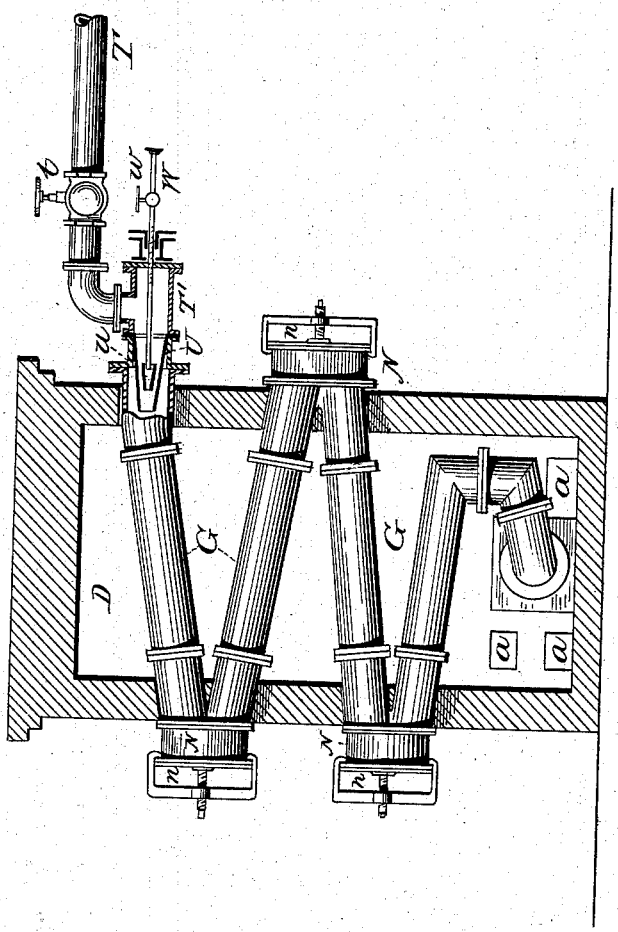

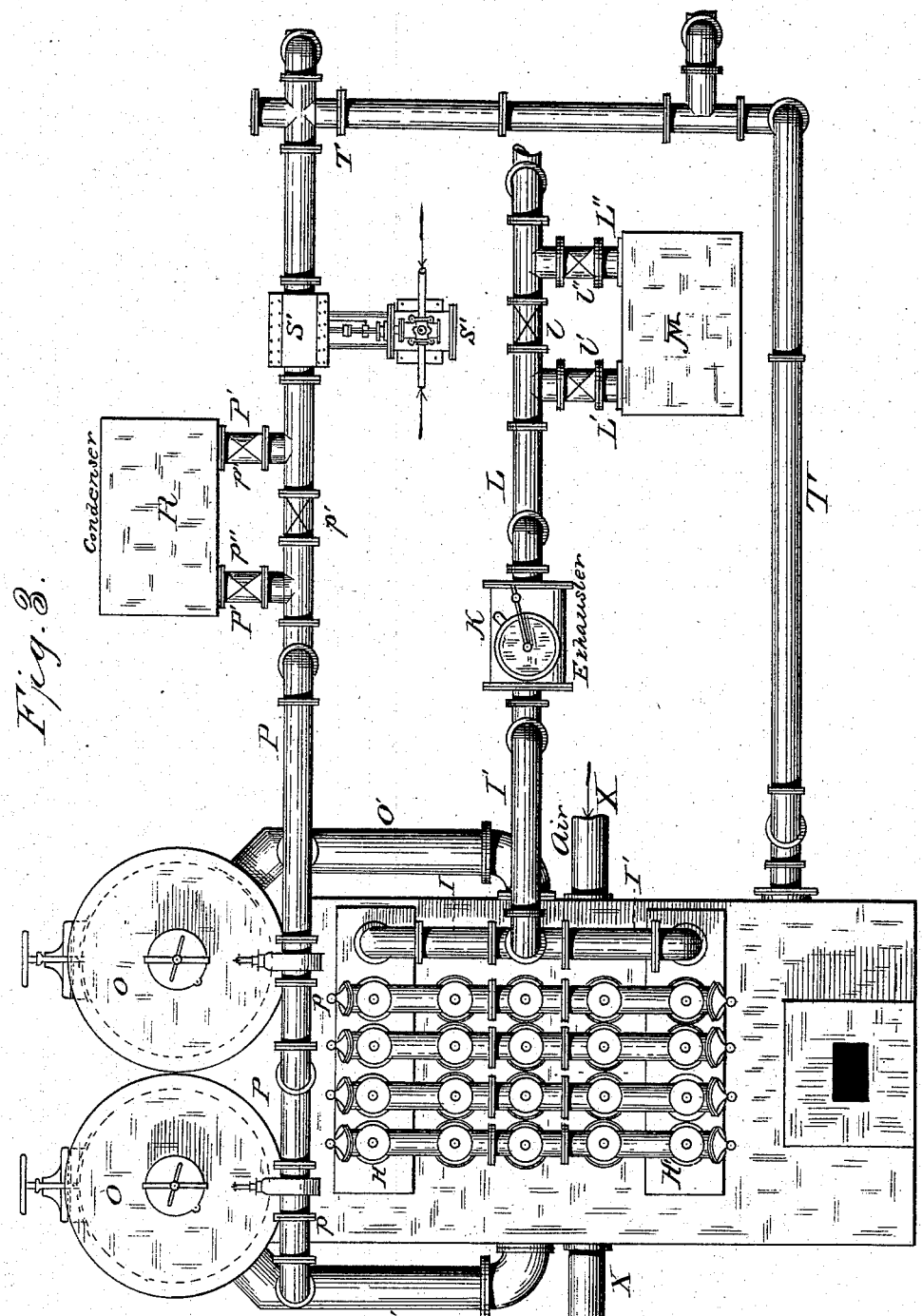

United States Patent Office.

JOHN L. STEWART, OF PHILADELPHIA, PENNSYLVANIA.

PROCESS OF AND APPARATUS FOR MANUFACTURING GAS.

SPECIFICATION forming part of Letters Patent No. 291,421, dated January 1, 1884.

Application filed May 2, 1883. (No model.)

*To all whom it may concern:*

Be it known that I, JOHN L. STEWART, of Philadelphia, in the county of Philadelphia and State of Pennsylvania, have invented certain new and useful Improvements in Process of and Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the production of gas for illuminating and heating purposes, by the combination, in a heated retort or retorts, of water-gas, composed of hydrogen and carbonic oxide, and hydrocarbon-oil vapor; and my invention consists in the process and in the combination of parts constituting the apparatus, as hereinafter more distinctly described and defined in the claims.

In the manufacture of illuminating-gas by the independent production of water-gas in one set of chambers or furnaces and the generation of gas from oil in another set of chambers or retorts, and subsequently mixing the water-gas with the rich oil-gas in the mains or holder, as has been practiced, much trouble and inconvenience has been caused from the uneven quality of the gas, from condensation of the oil-gas, and from deposit of carbon from the oil on the interior of the retorts. The gas was apt to stratify in the holder, and the flame at the burners was changeable in illuminating quality, arising from a want of uniformity in the candle-power of the gas.

The object of my invention is to cure these defects and produce a fixed gas of uniform candle-power; and in order to accomplish this result I combine the water-gas with oil-vapor in heated vaporizing-retorts, and then convert the commingled gas and vapor into a fixed homogeneous gas of the desired candle-power in separate hot retorts, as hereinafter more fully described. The water-gas, after having been sufficiently cooled, is forced by a pump, under pressure, into the nozzle or injector into which the oil is admitted, and thereby sprays the oil into the vaporizing retorts or conduits; and, further, the light hydrogen of the water-gas carries the oil-vapors forward, preventing them from being burned and from deposit, as carbon, on the walls of the retorts, and as soot in the mains. The excess of carbon is combined with the hydrogen, and all is utilized.

Having stated the nature and object of my invention, I will now proceed to more particularly describe it with reference to the accompanying drawings, in which—

Figure 1 represents a vertical section through the retort-chamber, the vaporizing-conduits, and the water-gas generator in elevation. Fig. 2 represents a vertical section on line $x\,x$, at right angles to Fig. 1, of the chamber containing the vaporizing-conduits. Fig. 3 represents a top plan view of the entire apparatus.

The retort-furnace A is built of substantial brick walls, and is provided with a vertical partition-wall, A', separating the fixing retort-chamber C from the chamber D, containing the vaporizing-conduits. The arched tops E E' are supported upon the outer walls and on the partition-wall. The partition-wall A' is provided with one or more openings, $a$, near to bottom, for the passage of products of combustion from chambers C C' to chamber D. Chamber C is provided near the bottom with a horizontal partition, B, supporting the vertical retorts F, and having distributed over its area, between the retorts, the short tubes $f$, leading into smoke-chamber C'. The retorts F are set in sockets in the partition B, and the joints may be luted or made tight by asbestus packing. The retorts extend through the arch at the top of the furnace, and are provided above with stand, bridge, and dip pipes connecting with the hydraulic mains. The middle retorts connect by short horizontal pipes with the stand-pipes of the side retorts, connecting with the mains H H' on each side. Pipes I I' connect with the mains, and unite with the main eduction-pipe I'', connecting with exhauster K, which in turn connects by pipe L and branches L' L'', having stop-valves $l\,l'\,l''$, with the scrubber M.

The vaporizing-conduits G are set in an inclined zigzag series in the chamber D, Fig. 2, and their connecting ends project through the outer walls of the chamber on opposite sides, where they are provided with heads or mouthpieces N, and tight-fitting lids n, which afford opportunity for cleaning the connecting sections of the conduit, should it become necessary. Instead of a single zigzag pipe, the vaporizer may be composed of a number of smaller pipes connecting with cross-heads at each end of an inclined section, for the purpose of affording a larger vaporizing-surface. The lower section of the vaporizing-conduits connects by a pipe, G', cross-pipes g, and riser-pipes g', with the lower ends of the fixing-retorts F, the riser-pipes projecting up into the retorts. To the upper section of the vaporizer is connected the head T', and with this connects the gas-pipe T, having a controlling-valve, t, and the nozzle U, for gas, and having within it the nozzle u, for oil, upon the screw-threaded adjustable oil-inlet pipe W, having valve w. The gas-inlet pipe T connects with the water-gas generators through intermediate parts, as presently described.

The water-gas generators O may be of the usual kind, in which steam is decomposed into hydrogen and carbonic oxide by contact with incandescent fuel, and they are connected by pipes O' with the retort and combustion-chamber C, for supplying gaseous products to such chamber for heating the retorts. The pipe P, connecting with pipes O', and the branches P' P'', having valve p p' p'', conduct water-gas into and out of the condenser or cooler R to the steam-pump S. The pump S, operated by engine S', forces the gas, under pressure, through pipe T to the injector and oil-spraying nozzles U u. (Shown in Fig. 2.) Air-pipes X enter the top of the chamber C, in proximity to the gas-pipes, to supply air for burning the gas. The gas and air may be supplied through numerous small distributing-pipes or through Bunsen burners. As the generators O produce water-gas intermittently, two of them are required for securing a constant supply of gas. While one of them is being fired up by blasts of air and producing gaseous products, which are burned in the retort-chamber C, the other one (previously heated) is producing water-gas by the decomposition of steam. A constant supply of water-gas being provided for, it is passed from the generator through the cooler, if too hot for the pump; but it is only partially cooled, and is forced at as high a degree as possible by the pump, under a considerable pressure, into injector, where it meets the stream of oil and atomizes it, and carries it forward into and through the vaporizing-conduit, where an intimate mixture and combination of the hydrogen and oil-vapor is effected. Decomposition and recomposition are completed in the retorts F, resulting in a fixed carbureted hydrogen gas, together with a small per cent. of carbonic oxide.

The gas may be made of any desired candle-power.

The oil-nozzle u, being connected to the screw-threaded pipe W, may be adjusted in or out of the gas-nozzle U, and thus nicely control the amount of gas admitted, and so proportion the supply of gas to the supply of oil as to make gas of the desired candle-power.

By maintaining the proper temperature in the retort and vaporizing-chambers, and properly adjusting the quantities of gas and oil admitted to the vaporizer, the retorts may be kept free from deposits and a fixed gas of uniform quality produced.

Having described my invention, what I claim, and desire to secure by Letters Patent, is—

1. The process of producing illuminating-gas, which consists in first generating heating-gas, composed of hydrogen and carbonic oxide, forcing such gas, under pressure, into an injecting device, and thereby spraying hydrocarbon liquid into a vaporizing apparatus, conducting the commingled gases and vapor through the heated vaporizer, and then combining and fixing the mixture in heated retorts.

2. The improvement in the art of manufacturing gas, which consists in generating a mixture of hydrogen and carbonic oxide by decomposing steam in contact with incandescent fuel, cooling such mixed gases, and then forcing them by a pump into an injecting device, and thereby spraying a stream of hydrocarbon liquid into a heated vaporizer, and finally combining and fixing the resulting vapor and gases by passing them through heated retorts.

3. The combination of the generator for producing water-gas, the vaporizing and mixing conduits or retorts provided with an injecting and atomizing device, the combining and fixing retorts, and connecting-pipes, whereby hydrocarbon liquid may be conducted into and through the vaporizing-retorts by a current of water-gas, as described.

4. The combination of the generator for producing water-gas, an exhausting and forcing pump, an injector and atomizing apparatus connecting with the gas-pipe, and an oil-supply pipe and suitably connected conduits or retorts for combining and fixing the mixture of the gas and vapor.

5. The two generators for producing water-gas, in combination with the vaporizing-conduits, the connected vertical fixing-retorts, pipes connecting the water-gas producers with the retort-ovens for supplying gas for heating the retorts, and a pipe connecting the water-gas producers with the vaporizing-conduits and an oil-supply pipe.

6. The injecting device having a connecting gas-supply pipe and a nozzle therefor projecting into the mouth-piece of the retort, and an adjustable threaded oil-supply pipe with a conical nozzle projecting into the gas-supply nozzle, in combination with the vaporizing conduits or retorts, all constructed and operated as described.

7. The vaporizing conduits or retorts having connected gas and oil supply pipes, in combination with the vertical fixing-retorts, a large connecting-pipe extending from the base of the vaporizer through a chamber below the fixing-retorts, and short stand-pipes uniting such pipe with the bases of the vertical retorts, in the manner shown and described.

8. The gas-retort oven having a horizontal division wall or diaphragm near the base thereof, provided with numerous outlet-passages between the retorts leading to the flue connecting with the chamber containing the vaporizing-conduits, in combination with the heating-gas producers, one or more, and a connecting-pipe conducting heating-gas into the top of the retort-oven, for the purpose described.

In testimony that I claim the foregoing as my own I affix my signature in presence of two witnesses.

JOHN L. STEWART.

Witnesses:
ROBT. J. MONTGOMERY,
EDWARD C. LEE.